(12) United States Patent
Huang et al.

(10) Patent No.: US 11,753,793 B2
(45) Date of Patent: Sep. 12, 2023

(54) TREATMENT METHOD FOR A RIVER SYSTEM IN A RESERVOIR AREA AND TREATMENT SYSTEM

(71) Applicant: China Institute of Water Resources and Hydropower Research, Beijing (CN)

(72) Inventors: Wei Huang, Beijing (CN); Xiaobo Liu, Beijing (CN); Zhuowei Wang, Beijing (CN); Yuan Si, Beijing (CN); Leixiang Wu, Beijing (CN); Chenguang Xiang, Beijing (CN); Likang Wang, Beijing (CN); Xingchen Liu, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 0 days.

(21) Appl. No.: 17/971,566

(22) Filed: Oct. 22, 2022

(65) Prior Publication Data
US 2023/0129304 A1  Apr. 27, 2023

(30) Foreign Application Priority Data
Oct. 26, 2021  (CN) .......................... 202111250090.6

(51) Int. Cl.
| | | |
|---|---|---|
| *E02F 5/28* | (2006.01) | |
| *A01G 24/22* | (2018.01) | |
| *G06V 20/05* | (2022.01) | |
| *G06V 10/82* | (2022.01) | |
| *G06V 20/10* | (2022.01) | |
| *G06V 10/774* | (2022.01) | |
| *A01M 21/02* | (2006.01) | |
| *E02B 3/02* | (2006.01) | |
| *E02D 29/00* | (2006.01) | |
| *E02F 3/90* | (2006.01) | |

(52) U.S. Cl.
CPC .............. *E02F 5/282* (2013.01); *A01G 24/22* (2018.02); *A01M 21/02* (2013.01); *E02B 3/02* (2013.01); *E02D 29/00* (2013.01); *E02F 3/907* (2013.01); *G06V 10/774* (2022.01); *G06V 10/82* (2022.01); *G06V 20/05* (2022.01); *G06V 20/188* (2022.01)

(58) Field of Classification Search
CPC ......... E02F 5/282; A01G 24/22; G06V 20/05; G06V 20/188; G06V 10/082; G06V 10/774; A01M 21/02; E02B 3/02; E02D 29/00
See application file for complete search history.

(56) References Cited

FOREIGN PATENT DOCUMENTS

| | | | |
|---|---|---|---|
| CN | 206680943 U | | 11/2017 |
| CN | 209957481 U | | 1/2020 |
| CN | 211172157 U | | 8/2020 |
| CN | 112523160 A | | 3/2021 |
| CN | 112851082 A | * | 5/2021 |
| CN | 113239863 A | | 8/2021 |

* cited by examiner

*Primary Examiner* — Tara Mayo
(74) *Attorney, Agent, or Firm* — Georgi Korobanov

(57) ABSTRACT

A treatment method for a river system in a reservoir area, comprising: S1. determining whether a time from a current date to the rainy season is less than a preset duration; S2. moving a pressure sensor upward; S3. determining whether the pressure data meets corresponding conditions; S4. determining whether a duration of the pressure data is less than the preset duration; S5. determining whether an interval between the current time and the time for collecting pressure/nitrogen and phosphorus is greater than a preset number of days; S6. acquiring an image information of a river bottom, and sending it to neural network model for identification to obtain a depth of a sludge; S7. determining whether the depth of a sludge has reached a dredging depth, if so, starting a sludge pump to clean up; S8. collecting nitrogen and phosphorus concentration, and removing nitrogen and phosphorus when the concentration exceeds a standard.

8 Claims, 3 Drawing Sheets

TREATMENT METHOD FOR A RIVER SYSTEM IN A RESERVOIR AREA AND TREATMENT SYSTEM

CROSS-REFERENCE TO RELATED APPLICATIONS

This application claims the benefit and priority of Chinese patent application No. 202111250090.6, filed on Oct. 26, 2022, disclosure of which is hereby incorporated by reference in its entirety.

TECHNICAL FIELD

The present application relates to a river treatment technology, in particular to a treatment method for a river system in a reservoir area and a treatment system thereof.

BACKGROUND

After the reservoir is impounded, the water surface of the river channel in the reservoir area becomes wider, the flow rate slows down, the self-purification capacity of the water body is weakened, and it is more sensitive to the change of pollutants. The quality of the water environment in the reservoir area directly determines the quality of the downstream river channel. At the same time in the downstream river channel, people will discharge garbage into the river channel in production and life to pollute the river channel. After a period, sludge will accumulate on the bottom of the river channel. After a long time, the river channel will be blocked, the river water will rise, the water quality will deteriorate, and even odor will occur, so it is necessary to regularly dredge the river. To avoid excessive sludge in the river channel affecting the normal flow of river water, the management department needs to send personnel to regularly inspect the sludge situation in the river section of the reservoir area, and clean up the sludge in time to ensure the normal operation of the river channel.

SUMMARY

Aiming at the above-mentioned deficiencies in the prior art, the treatment method and the treatment system for the river system in the reservoir area provided by the present application solve the problem of low efficiency of requiring regular manual inspection of the river.

To achieve the above-mentioned purpose of the invention, the technical scheme adopted in the present application is:

In a first aspect, a treatment method for a river system in a reservoir area is provided, comprising the steps:

S1. reading a current date, and determining whether a time from the current date to a rainy season is less than a preset duration, if so, go to step S2, otherwise executes step S8;

S2. Moving a pressure sensor arranged at a preset position of the river bottom at a monitoring point upward by a preset distance through a lifting mechanism and sending pressure data collected by the pressure sensor to a data processing module;

S3. determining whether the pressure data gradually decreases, and determining whether the pressure data in a front section is at least greater than a preset pressure of the pressure data in the remaining sections in the entire period; if so, go to step S4, otherwise go to step S5;

S4. determining whether a duration of the pressure data in the front section is less than the preset duration, if so, go to step S5, otherwise go to step S6;

S5. obtaining the current time, and determining whether an interval between the current time and the time for collecting pressure/nitrogen and phosphorus is greater than a preset number of days, if so, return to step S1, otherwise continue to perform step S5;

S6. acquiring an image information of the river bottom within a preset range of the pressure sensor, and sending it to a trained neural network model stored in the data processing module for identification to obtain a depth of a sludge;

S7. determining whether the depth of sludge has reached a dredging depth, if so, start a sludge pump to transport the sludge to a sludge tank, and then return to step S5; otherwise, return directly to step S5;

S8. collecting nitrogen and phosphorus concentration of water body in a river channel, and when the nitrogen and phosphorus concentration exceeds the standard, and when no cages containing aquatic plants are placed in the river channel, putting the cages containing aquatic plants into a river section, and then return to step S5.

In a second aspect, a treatment system is provided, which comprises a data acquisition device, a sludge cleaning mechanism, and a nitrogen and phosphorus removal mechanism; the data acquisition device comprises:

a mounting cylinder, which is a transparent cylindrical body with closed upper and lower ends, a first annular plate is fixedly installed at the upper end of the mounting cylinder, a second annular plate is slidably installed at the lower end, and a mounting column is connected to a bottom of the mounting cylinder;

a flexible protective cover, which is wrapped around the outer side of the mounting cylinder, the upper and lower ends are respectively fixed on the first annular plate and the second annular plate, and a closed sealed cavity is formed between the flexible protective cover, the first annular plate, the second annular plate and the outer wall of the mounting cylinder;

a lifting mechanism, which is located in the sealed cavity; an upper end of which is fixed on the first annular plate, and a lower end of which is fixed on the second annular plate, for driving the second annular plate to slide up and down on the mounting cylinder;

a data acquisition module, comprising a pressure sensor mounted on a second annular plate outside the flexible protective cover, a nitrogen-phosphorus detector mounted on the first annular plate outside the flexible protective cover, and an image acquisition module fixed in the mounting cylinder;

a data processing module, which is installed in the mounting cylinder and is connected with the pressure sensor, nitrogen and phosphorus detector, image acquisition module, and a power supply module in the mounting cylinder, and communicates with the management terminal of the supervision department through a wireless transceiver module;

the sludge cleaning mechanism comprises a sludge pump, which is connected with the management end; the nitrogen and phosphorus removal mechanism comprises several cages for holding aquatic plants.

The beneficial effects of the present application are as follows: during the river treatment in this technical solution, when the rainy season is about to be approached, the pressure sensor is moved to determine whether the pressure sensor is covered with sludge, and when there is sludge, the sensor enters the sludge for confirmation, so as to determine whether to carry out sludge treatment. In this way, the collection of sludge at the bottom of the river can be automatically realized, and the sludge is determined by combining the pressure sensor and the image to ensure the accuracy of the sludge detection and ensure that the sludge can be cleaned in time.

In addition, when the rainy season is not reached, the nitrogen and phosphorus in the river can be monitored to clean up the river when the nitrogen and phosphorus exceed the standard, so as to avoid the eutrophication of the river and the growth of a large number of algae, and the river will become black and smelly due to lack of oxygen.

REFERENCE SIGNS

1. Mounting cylinder; 11. First annular plate; 12. Second annular plate; 13. Mounting column; 2. Flexible protective cover; 3. Data acquisition module; 31. Pressure sensor; 32. Nitrogen and phosphorus detector; 33. Image acquisition module; 4. Data processing module; 5. Power supply module; 6. Lifting mechanism.

DETAILED DESCRIPTION

The specific embodiments of the present application are described below to facilitate those skilled in the art to understand the present application, but it should be clear that the present application is not limited to the scope of the specific embodiments. Various modifications will be apparent to those skilled in the art insofar as they are within the spirit and scope of the invention as defined and determined by the appended claims. All inventions and creations utilizing the concept of the present invention are protected.

In the technical solution, before the treatment of the river system in the reservoir area, it is necessary to process the river monitoring points, which may comprise:

Dividing the river into several sections, and setting up a monitoring point at several typical locations in each section of the river; By monitoring the river in sections, it is convenient to control the sludge and river water in the river section in sections.

Emptying the water within a preset range of the monitoring point, cleaning up the sludge, and installing a data acquisition device with pressure, image, nitrogen, and phosphorus acquisition functions at the monitoring point;

Using concrete to harden the river bottom within the preset range of the monitoring point, and making the river bottom within the preset range of the monitoring point in the same flatness; concrete hardening treatment of the river bottom within the preset range can ensure the stability of the data acquisition device after installation on the one hand, and on the other hand, it can ensure that the river bottom within the preset range is at the same height, so as to ensure the accuracy of sludge depth detection.

After the concrete meets a maintenance requirement, backfilling the sludge within the preset range of the monitoring point, and making the depth of the backfilled sludge equal to the depth of the sludge removed when the water is emptied.

Figure 1:
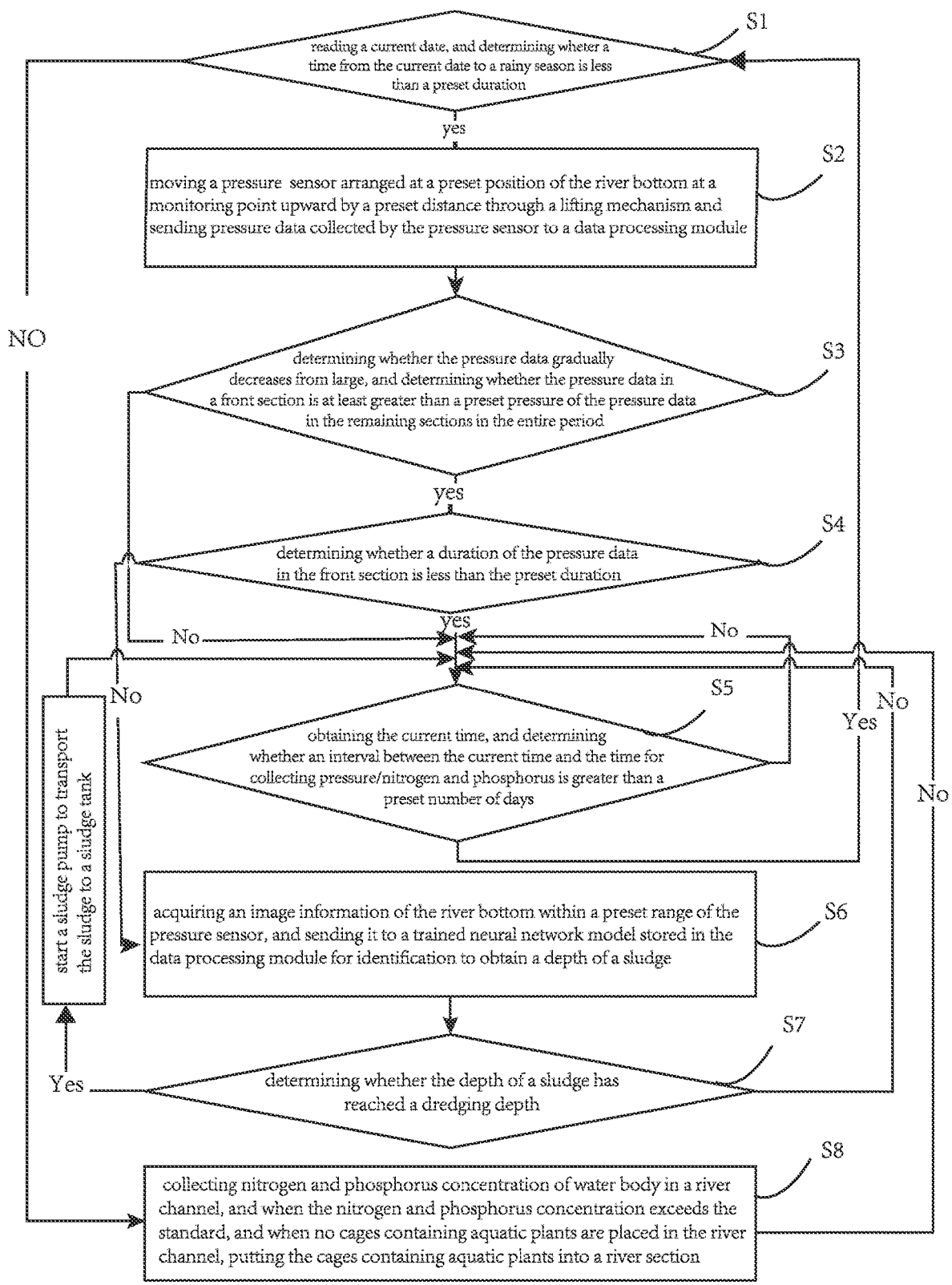
FIG. 1 is a flow chart of an embodiment of a treatment method for a river system in a reservoir area.

Referring to FIG. 1, FIG. 1 shows a flow chart of an embodiment of a treatment method for a river channel system in a reservoir area; as shown in FIG. 1, it comprises steps S1 to S8.

In step S1, reading a current date, and determining whether a time from the current date to a rainy season is less than a preset duration, if so, go to step S2, otherwise execute step S8; The preset duration here can be one month, so that there is enough time to clean the sludge at the bottom of the river.

In step S2, moving a pressure sensor 31 arranged at a preset position of the river bottom at a monitoring point upward by a preset distance through a lifting mechanism and sending pressure data collected by the pressure sensor 31 to a data processing module 4.

The pressure sensor 31 of this solution is installed at the bottom of the river. When there is sludge, the pressure sensor 31 will be buried in the sludge. When the moving pressure sensor 31 is blocked by sludge, the resistance it receives is relatively large, and when moving in river water, the pressure is relatively small.

In step S3, determining whether the pressure data gradually decreases, and determining whether the pressure data in a front section is at least greater than a preset pressure of the pressure data in the remaining sections in the entire period; if so, go to step S4, otherwise go to step S5;

When the pressure sensor 31 is moved in the sludge, the pressure collected by the pressure sensor 31 will decrease greatly. When moving into the river, the pressure will also decrease gradually. But the pressure will be much lower when entering the river water, and the pressure will be much lower than when moving in the sludge. Based on this situation, this scheme divides all pressure data into two parts with the momentary pressure increasing as the time node.

In step S4, determining whether a duration of the pressure data in the front section is less than the preset duration, if so, go to step S5, otherwise go to step S6.

In step S4, the depth of the sludge can be obtained through the preset time length and the moving speed of the pressure sensor 31, so as to realize the preliminary determination of the sludge depth, and then determine the sludge depth in a larger range through image acquisition. This can improve the accuracy of sludge depth detection, and can avoid starting the cleaning equipment when there is local sludge.

In step S5, obtaining the current time, and determining whether an interval between the current time and the time for collecting pressure/nitrogen and phosphorus is greater than a preset number of days, if so, return to step S1, otherwise continue to perform step S5; The preset number of days here is at least greater than 1 month, because it takes a long time to deposit a certain thickness of sludge, and it is not meaningful to monitor too frequently.

In step S6, acquiring an image information of the river bottom within a preset range of the pressure sensor, and sending it to a trained neural network model stored in the data processing module 4 for identification to obtain a depth of a sludge; The data processing module 4 here can be a microprocessor.

In one embodiment of the present invention, the training method of the neural network model of this solution comprises:

A1. building a pool with the same size as the preset range of the monitoring point, trimming the bottom of the pool, and then installing the data acquisition device at the bottom of the pool;

A2. installing a carrying board with a size equal to the area of the pool bottom at the bottom of the pool through the lifting mechanism, and spreading a layer of sludge on the carrying board, and then pour water into the pool until the water floods the data acquisition device; The lifting mechanism 6 here can be a lift motor, and the setting of the lift motor can ensure accurate and rapid adjustment of the preset height later.

A3. adjusting the lifting mechanism so that the sludge surface is at a preset height from the bottom of the pool, after the water in the pool is clarified, acquiring several image information of the bottom of the pool by the data acquisition device;

A4. Setting preset height reset height+adjusted height, and determining whether the preset height is greater than the dredging height, if so, go to step A5, otherwise, return to step A3.

The adjusted height here should be controlled at 1-5 cm as much as possible. The smaller the adjusted height is, the more images are collected at each height, the more accurate the trained neural network model will be, and the more accurate the subsequent sludge depth detection will be.

A5. preprocessing all the acquired images, and then manually marking two-thirds of the image information acquired each time as a training image, and the rest as a test image.

A6. Taking all the training pictures as a training set and all the test pictures as a test set; and use the training set and the test set to train a convolutional neural network to obtain a trained neural network model.

In step S7, determining whether the depth of sludge has reached a dredging depth, if so, start a sludge pump to transport the sludge to a sludge tank, and then return to step S5; otherwise, return directly to step S5.

In an embodiment of the present invention, before starting the sludge pump, it further comprises:

Extending a stirring paddle into the sludge, stirring the sludge for 163 min, acquiring a sludge image at a stirring place while stirring, and collecting a paddle image information on the stirring paddle after the stirring paddle rises;

analyzing the sludge image and the paddle image information by the data processing module 4 to determine whether there is aquatic plant entanglement in the paddle image information and whether there is solid waste in the sludge image;

when there are aquatic plants and/or solid waste, cutting the solid waste and aquatic plants in the sludge by a crushing device, and loosening the sludge at the same time;

selecting a sludge pump with an impeller with a cutting function, and then starting the sludge pump for cleaning.

Through the determination of aquatic plants and solid waste, this solution can prevent the water plants from entangling the impeller when the sludge pump is transporting sludge, and the solid waste blocks the conveying pipeline, resulting in failure of the sludge pump and the pipeline system, affecting the rapid removal of sludge at the bottom of the river.

In the step S8, collecting nitrogen and phosphorus concentration of water body in a river channel, and when the nitrogen and phosphorus concentration exceeds the standard, and when no cages containing aquatic plants are placed in the river channel, putting the cages containing aquatic plants into a river section, and then return to step S5.

In the implementation of this solution, after the aquatic plants are put in, it also comprises:

Collecting the length of the aquatic plants in the cage every preset growth cycle, and taking out the aquatic plants in the cage when the aquatic plants grow to maturity;

After crushing the aquatic plants, putting them into the sludge tank, and stirring the aquatic plants and the sludge evenly, and then transferring the sludge to a garden management office to mix with the soil as plant cultivation soil.

Since the sludge is generally highly eutrophic, mixing the sludge with aquatic plants can increase the necessary elements for plant growth in the sludge, and the mixed materials can be used as plant cultivation soil. It can also be transported to farmland to provide nutrients for the growth of crops.

The treatment method of the river system in the reservoir area according to this solution also comprises: calculating a time interval between two adjacent times for cleaning the sludge by the sludge pump; when three consecutive intervals are less than one year, increasing the planting of plants on both sides of the river bank to form a river bank slope protection.

By monitoring the interval of sludge cleaning time, it can be determined whether the sludge cleaning is frequent, if it is too frequent, it means that there is more soil entering the river. The main reason for this is that the surrounding soil erosion is relatively serious, which led to the influx of a large amount of soil into the river. In order to ensure the local ecological environment, we can start by improving the local water and soil.

In the implementation of this solution, when throwing cages in the river, aeration is carried out to the bottom of the river at the place where the cages are put, and aeration is performed twice every day, and each aeration time is half an hour. In this way; the oxygen concentration in the river can be increased, the growth rate of aquatic plants can be accelerated, and the absorption of nitrogen and phosphorus in the river water can be accelerated.

The treatment method of this scheme can be started all the time, or it can be restarted after the treatment method is stopped for 2-3 months when it is far away from the rainy season and the concentration of nitrogen and phosphorus collected at least three times does not exceed the standard.

Figure 2:
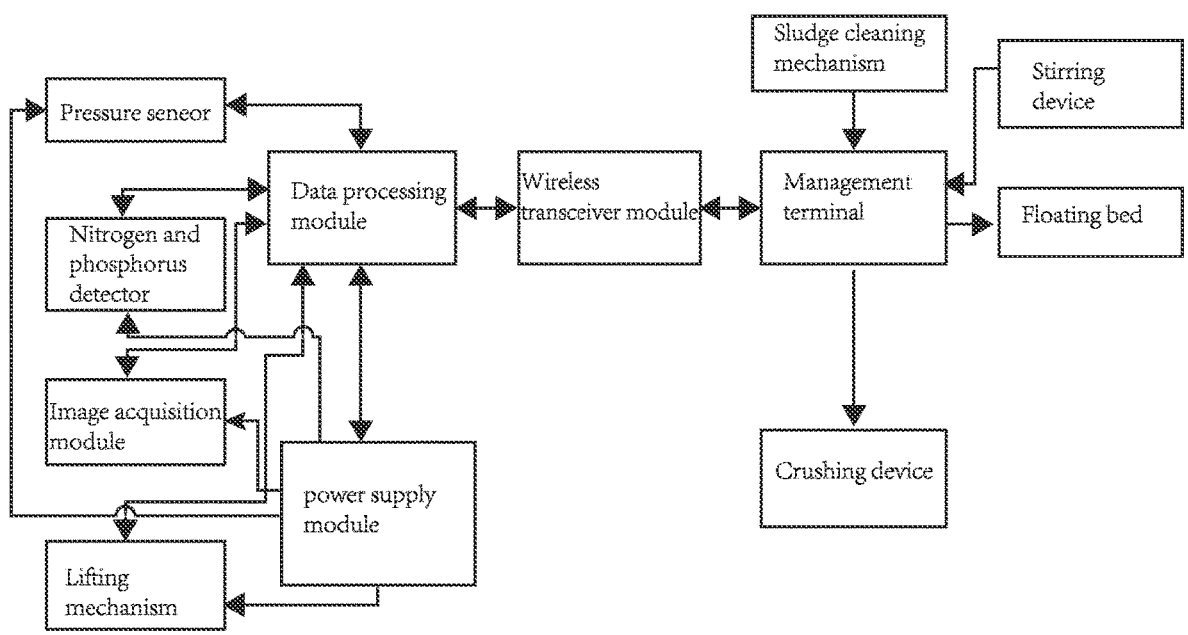
FIG. 2 is a schematic block diagram of the treatment system for the river system in the reservoir area.
Figure 3:
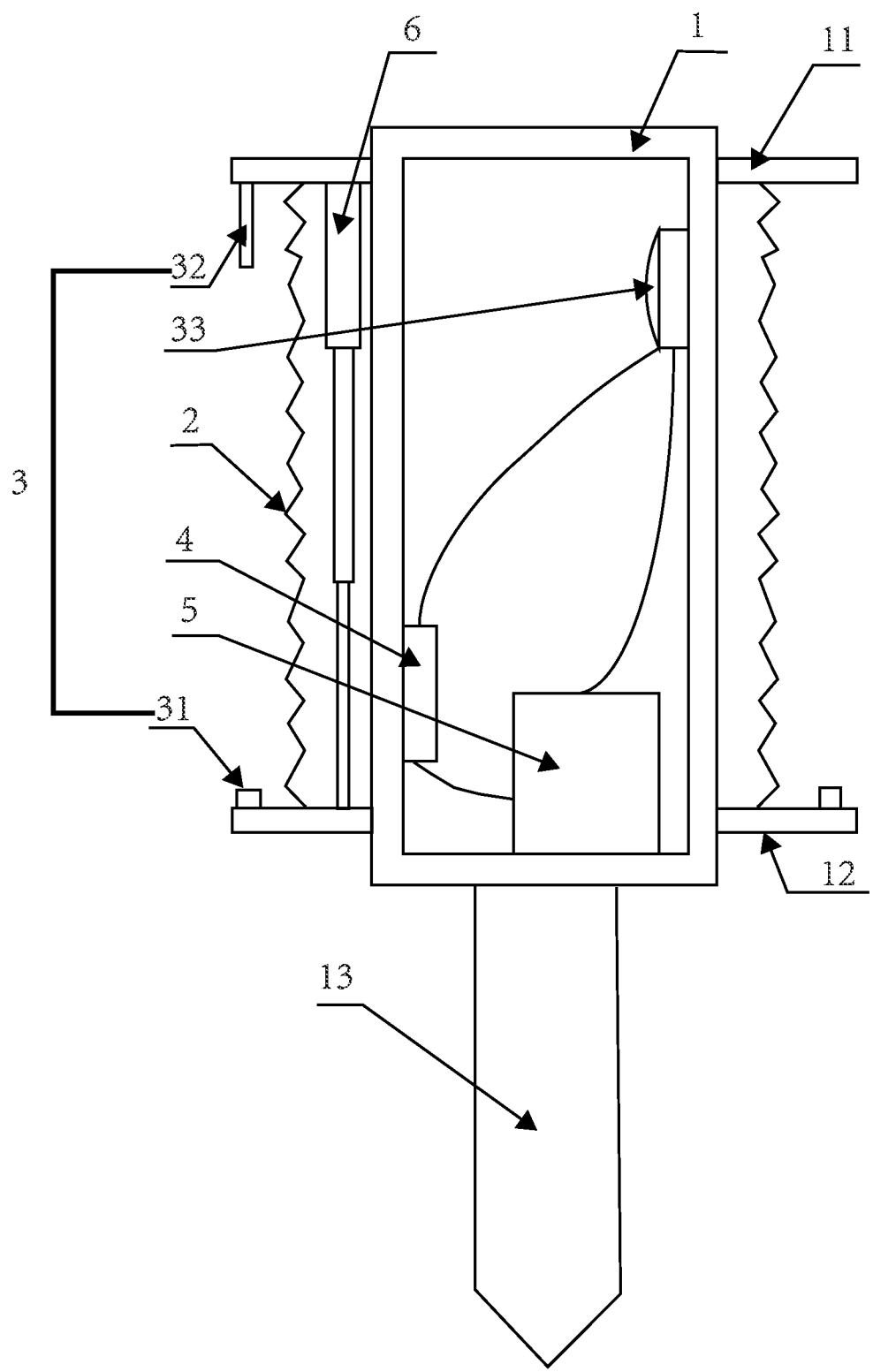
FIG. 3 is a schematic structural diagram of a data acquisition device.

As shown in FIGS. 2 and 3, this solution also provides a treatment system for a treatment method for a river system in a reservoir area, which comprises a data acquisition device, a sludge cleaning mechanism, and a nitrogen and phosphorus removal mechanism; the data acquisition device comprises:

a mounting cylinder 1, which is a transparent cylindrical body with closed upper and lower ends, a first annular plate 11 is fixedly installed at the upper end of the mounting cylinder, a second annular plate 12 is slidably installed at the lower end, and a mounting column 13 is connected to a bottom of the mounting cylinder 1.

The mounting cylinder 1 is designed as a closed structure, which can facilitate the protection of the electrical components installed in it, and avoid damage to the electrical components caused by long-term immersion in water; The mounting cylinder 1 is designed as a transparent structure, which can facilitate the image acquisition module 33 to acquire images.

a flexible protective cover 2, which is wrapped around the outer side of the mounting cylinder 1, the upper and lower ends are respectively fixed on the first annular plate 11 and the second annular plate 12, and a closed sealed cavity is formed between the flexible protective cover 2, the first annular plate 11, the second annular plate 1 and the outer wall of the mounting cylinder 1.

The main purpose of setting the flexible protective cover 2 in this solution is to protect the mounting cylinder 1 and prevent some algae from using the mounting cylinder 1 as a growth attachment, so that the mounting cylinder 1 is covered with algae. This will affect the acquisition of images of the river bottom by the image acquisition module 33. Secondly, the flexible protective cover 2 can also protect the lifting mechanism 6 to prevent it from contacting with water and improve the service life.

The flexible protective cover 2 must be made of flexible and waterproof material, such as geotextile; preferably, it has a certain elasticity, such as rubber.

a lifting mechanism 6, which is located in the sealed cavity, an upper end of which is fixed on the first annular plate, and a lower end of which is fixed on the second annular plate, for driving the second annular plate to slide up and down on the mounting cylinder 1;

Preferably, the lifting mechanism 6 is an electric push rod. In order to ensure the service life of the electric push rod, it is better to waterproof the electric push rod to ensure that it can operate normally even if it works in water.

The lifting mechanism 6 of this solution has two main functions, one of which is to lift and lower with the pressure sensor 31 to achieve preliminary detection of soil, and the other is to lift and lower with the flexible protective cover 2 to expose or close the mounting cylinder 1.

a data acquisition module 3, comprising a pressure sensor 31 mounted on a second annular plate 12 outside the flexible protective cover 2, a nitrogen-phosphorus detector 32 mounted on the first annular plate 11 outside the flexible protective cover 2, and an image acquisition module 33 fixed in the mounting cylinder 1.

When the treatment system of this solution is used for river treatment, the data acquisition module is submerged in water, a data processing module 4, which is installed in the mounting cylinder 1 and is connected with the pressure sensor 31, nitrogen and phosphorus detector 32, image acquisition module 33 and a power supply module 5 in the mounting cylinder 1, and communicates with the management terminal of the supervision department through a wireless transceiver module.

The pressure sensor 31, the nitrogen and phosphorus detector 32, the image acquisition module 33, the lifting mechanism 6 and the wireless transceiver module are all connected to the power supply module 5. The sludge cleaning mechanism includes a sludge pump, which is connected with the management end; the nitrogen and phosphorus removal mechanism includes several cages for holding aquatic plants.

When implementing this solution, preferably, the sludge cleaning mechanism further comprises a floating bed, and the floating bed is equipped with a stirring device, which is used to extend to the bottom of the river to determine whether there are aquatic plants in the sludge, and a crushing device, which is used to pulverize the solid waste in the sludge at the bottom of the river; both the stirring device and the crushing device communicate with the management terminal.

When there is sludge, the information is sent to the management terminal, and the management terminal starts the floating bed to move it to the data acquisition device, then starts the stirring device to stir, and then uses the image acquisition module 33 in the mounting cylinder 1 to perform image acquisition, and the image information is sent to the data processing module 4 for analysis, and the information of the analyzed aquatic plants or solid waste is sent to the management terminal through the wireless transceiver module. The management terminal starts the crushing device to crush the aquatic plants and solid waste to ensure that the pipeline system will be blocked during the subsequent sludge transportation.

The treatment system of this solution also comprises a vibrating filter screen installed above the sludge tank for screening the crushed garbage in the sludge, and the vibration filter screen communicates with the management terminal. After being set in this way, the crushed solid waste can be screened out, so as to prevent the mixed waste from polluting the soil when the sludge is used later.

In summary, the treatment method and treatment system in the reservoir area provided by this solution can automatically monitor the sludge and water quality in the river channel, so as to gradually automate the river channel treatment and improve the river treatment efficiency.

What is claimed is:

1. A treatment method for a river system in a reservoir area, comprising the steps of:

step (S1) reading a current date, and determining whether a time from the current date to a rainy season is less than a preset duration, if so, go to step (S2), otherwise executes step (S8);

step (S2) moving a pressure sensor arranged at a preset position of the river bottom at a monitoring point upward by a preset distance through a lifting mechanism and sending pressure data collected by the pressure sensor to a data processing module;

step (S3) determining whether the pressure data gradually decreases, and determining whether the pressure data in a front section is at least greater than a preset pressure of the pressure data in the remaining sections in an entire period; if so, go to step (S4), otherwise go to step (S5);

step (S4), determining whether a duration of the pressure data in the front section is less than the preset duration, if so, go to step (S5), otherwise go to step (S6);

step (S5) obtaining the current time, and determining whether an interval between the current time and the time for collecting pressure/nitrogen and phosphorus is greater than a preset number of days, if so, return to step (S1), otherwise continue to perform step (S5);

step (S6) acquiring an image information of the river bottom within a preset range of the pressure sensor, and sending it to a trained neural network model stored in the data processing module for identification to obtain a depth of a sludge;

step (S7) determining whether the depth of sludge has reached a dredging depth, if so, start a sludge pump to transport the sludge to a sludge tank, and then return to step five; otherwise, return directly to step (S5);

step (S8) collecting nitrogen and phosphorus concentration of water body in a river channel, and when the nitrogen and phosphorus concentration exceeds the standard, and when no cages containing aquatic plants are placed in the river channel, putting the cages containing aquatic plants into a river section, and then return to step (S5);

before using the treatment method also comprising:

dividing the river into several sections, and setting up a monitoring point at several locations in each section of the river;

emptying the water within a preset range of the monitoring point, cleaning up the sludge, and installing a data acquisition device with pressure, image, nitrogen and phosphorus acquisition functions at the monitoring point;

using concrete to harden the river bottom within the preset range of the monitoring point, and making the river bottom within the preset range of the monitoring point in the same flatness;

after the concrete meets a maintenance requirement, backfilling the sludge within the preset range of the monitoring point, and making the depth of the backfilled sludge equal to the depth of the sludge removed when the water is emptied.

2. The treatment method for a river system in a reservoir area according to claim 1, wherein the training method of the neural network model comprising:

step (A1) building a pool with the same size as the preset range of the monitoring point, trimming the bottom of the pool, and then installing the data acquisition device at the bottom of the pool;

step (A2) installing a carrying board with a size equal to the area of the pool bottom at the bottom of the pool through the lifting mechanism, and spreading a layer of sludge on the carrying board, and then pour water into the pool until the water floods the data acquisition device;

step (A3) adjusting the lifting mechanism so that the sludge surface is at a preset height from the bottom of the pool, after the water in the pool is clarified, acquiring several image information of the bottom of the pool by the data acquisition device;

step (A4) Setting preset height=preset height+adjusted height, and determining whether the preset height is greater than the dredging height, if so, go to step (A5), otherwise return to step (A3);

step (A5) preprocessing all the acquired images, and then manually marking two-thirds of the image information acquired each time as a training image, and the rest as a test image;

step (A6) Taking all the training pictures as a training set and all the test pictures as a test set; and use the training set and the test set to train a convolutional neural network to obtain a trained neural network model.

3. The treatment method for a river system in a reservoir area according to claim 1, wherein after the aquatic plants are put in, also comprising:

collecting the length of the aquatic plants in the cage every preset growth cycle, and taking out the aquatic plants in the cage when the aquatic plants grow to maturity;

after crushing the aquatic plants, putting them into the sludge tank, and stirring the aquatic plants and the sludge evenly, and then transferring the sludge to a garden management office to mix with the soil as plant cultivation soil.

4. The treatment method for a river system in a reservoir area according to claim 1, further comprising: calculating a time interval between two adjacent times for cleaning the sludge by the sludge pump; when three consecutive intervals are less than one year, increasing the planting of plants on both sides of the river bank to form a river bank slope protection.

5. The treatment method for a river system in a reservoir area according to claim 1, wherein when throwing cages in the river, aeration is carried out to the bottom of the river at the place where the cages are put, and aeration is performed twice every day, and each aeration time is half an hour.

6. A treatment system for the treatment method for a river system in a reservoir area according to claim 1, comprising: a data acquisition device, a sludge cleaning mechanism and a nitrogen and phosphorus removal mechanism; the data acquisition device comprises:

a mounting cylinder, which is a transparent cylindrical body with closed upper and lower ends, a first annular plate is fixedly installed at the upper end of the mounting cylinder, a second annular plate is slidably installed at the lower end, and a mounting column is connected to a bottom of the mounting cylinder;

a flexible protective cover, which is wrapped around the outer side of the mounting cylinder, the upper and lower ends are respectively fixed on the first annular plate and the second annular plate, and a closed sealed cavity is formed between the flexible protective cover, the first annular plate, the second annular plate and the outer wall of the mounting cylinder;

a lifting mechanism, which is located in the sealed cavity, an upper end of which is fixed on the first annular plate, and a lower end of which is fixed on the second annular plate, for driving the second annular plate to slide up and down on the mounting cylinder;

a data acquisition module, comprising a pressure sensor mounted on a second annular plate outside the flexible protective cover, a nitrogen-phosphorus detector mounted on the first annular plate outside the flexible protective cover, and an image acquisition module fixed in the mounting cylinder;

a data processing module, which is installed in the mounting cylinder and is connected with the pressure sensor, nitrogen and phosphorus detector, image acquisition module and a power supply module in the mounting cylinder, and communicates with the management terminal of the supervision department through a wireless transceiver module;

the sludge cleaning mechanism comprises a sludge pump, which is connected with the management end; the nitrogen and phosphorus removal mechanism comprises several cages for holding aquatic plants.

7. The treatment system according to claim 6, wherein the sludge cleaning mechanism further comprises a floating bed, and the floating bed is equipped with a stirring device, which is used to extend to the bottom of the river to determine whether there is aquatic plants in the sludge, and a crushing device, which is used to pulverize the solid waste in the sludge at the bottom of the river; both the stirring device and the crushing device communicate with the management terminal.

8. The treatment system according to claim 6, further comprising a vibrating filter screen installed above the sludge tank and used for screening the pulverized garbage in the sludge, the vibration filter screen communicates with the management terminal.

* * * * *